T. DAILEY.
GATE LATCH.
APPLICATION FILED APR. 3, 1908.
925,874.
Patented June 22, 1909.
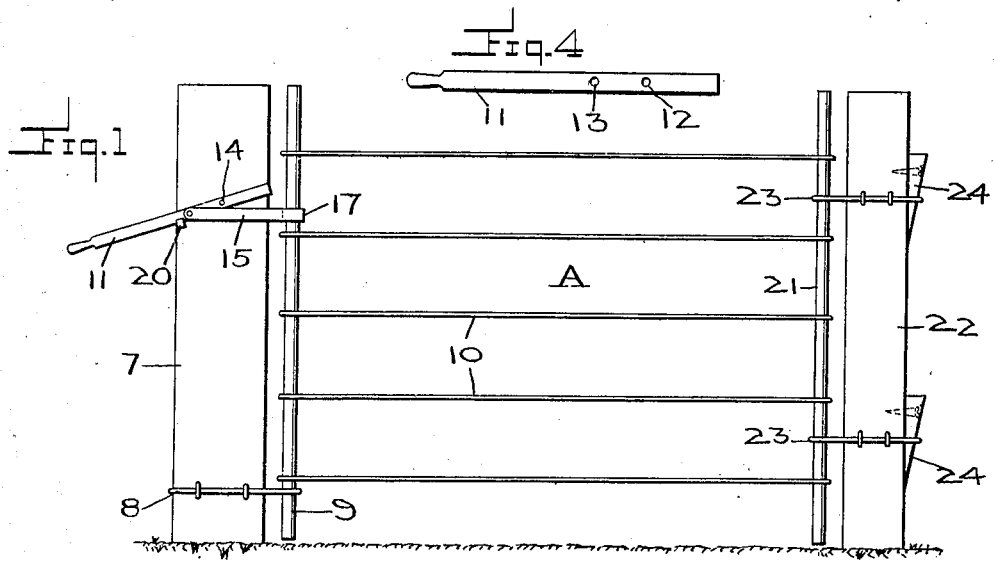
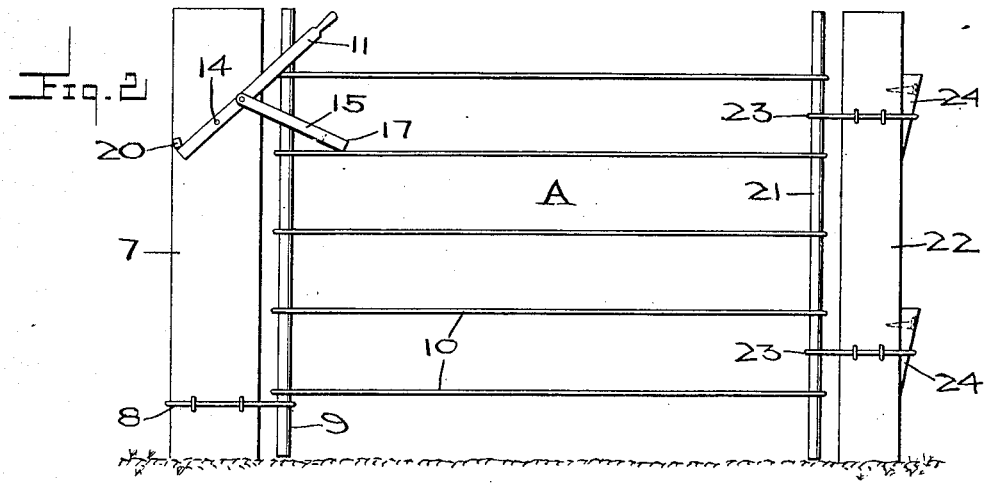
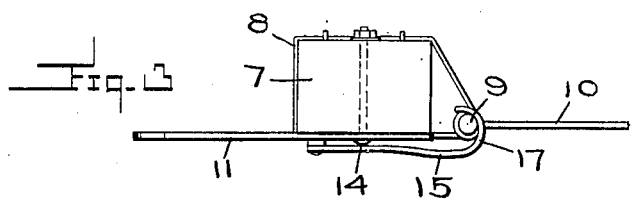
Witnesses
Ed. P. Lusby.
E. L. Chandler.
Inventor
Thomas Dailey.
By Woodward & Chandler
Attorneys

UNITED STATES PATENT OFFICE.

THOMAS DAILEY, OF KIBBEY, MONTANA.

GATE-LATCH.

No. 925,874.   Specification of Letters Patent.   Patented June 22, 1909.

Application filed April 3, 1908. Serial No. 425,027.

*To all whom it may concern:*

Be it known that I, THOMAS DAILEY, a citizen of the United States, residing at Kibbey, in the county of Cascade and State of Montana, have invented certain new and useful Improvements in Gate-Latches, of which the following is a specification.

This invention relates to fence gates, and more particularly to latches therefor, and has for its object to provide a latch particularly suitable for use on wire gates having no framework.

Another object is to provide such a latch comprising but few parts and which will be effective in its operation.

Another object is to provide a latch which may be easily attached to any gate post.

Another object is to provide such a latch which may be manufactured at low cost from stock materials.

Other objects and advantages will be apparent from the following description and it will be understood that changes in the specific structure shown and described may be made within the scope of the claims without departing from the spirit of the invention.

In the drawings forming a portion of this specification and in which similar parts are indicated by like characters of reference in the several views, Figure 1 is a side view of the present latch in operative position in engagement between the post and the gate of wire, Fig. 2 is a similar view showing the latch in disengaged position, Fig. 3 is a top view of the gate post and the free end of a wire gate showing the present latch engaged therewith in operative position. Fig. 4 is a detail view of the operating lever.

Referring now to the drawings, there is shown a gate post 7, having around its base a loop of wire 8, through which is engaged the lower end of a rod 9, carrying the wires 10 of a gate A, these being familiar details in the construction of gates of this type. An operating lever 11, having openings 12 and 13 located near one end and spaced longitudinally thereof, is secured pivotally to the post 7 by means of a bolt 14 passing through the opening 12. A latch member 15 comprising a bar having one end bent to form an enlarged hook, is engaged pivotally at its opposite end with the opening 13. The hook 17 extends inwardly toward the post 7, and is engaged detachably over the bar 9. A stop member 20 is secured to the post 7 outwardly of the bolt 14 and is arranged to check the operating lever 11 at the rearward extent of its movement, when it lies with its free end slightly below the horizontal. When the lever 11 is thrown forward, the hook 17 moves in coöperation therewith and allows the disengagement of the bar 9 for the opening of the gate. When in closed position the tension of the wires of the gate serves to hold the latch against accidental release, as may be seen.

It will be seen that a latch is provided comprising but two main operating parts, and which may be secured to the gate post by the use of but one bolt.

The pivot end of the gate comprises a vertical rod 21, similar to the rod 9, having the wires 10 secured thereto as shown. Loops of wire or other suitable means 23 are coengaged with the post 22 and the rod 21, to form a pivot for the gate. Engaged slidably between the loops 23 and the outer side of the post 22, there are wedges 24, arranged to be forced under the loops and secured, to provide a proper tension on the gate for effective operation thereof.

It will thus appear that an effective device is provided for latching a gate, including means for adjusting the tension of the gate.

What is claimed is:

1. The combination with a wire gate having a post of a lever having longitudinally spaced openings inwardly of one end, a pivot member engaged with the post and pivotally engaged in the outer of said openings, a gate engaging hook pivotally engaged in the inner of said openings, and adapted to engage with a gate to draw it toward the post upon rearward oscillation of said lever, and a stop pin engaged in said post spaced from the horizontal plane of said pivot member, and adapted to check said lever at the rearward limit of its movement and at the forward limit of its movement, and separate means adapted to coöperate with said latch to increase the tension upon the gate.

2. The combination with a wire gate having a post and pivot post of a lever having longitudinally spaced openings inwardly of one end, a pivot member engaged with the post through the outer of said openings, a gate engaging hook pivotally engaged in the inner of said openings, and adapted to engage with a gate to draw it toward the post upon rearward oscillation of said lever, and a stop pin engaged in said post and spaced horizontally of said pivot member, and adapted to check said lever at the rearward limit of its movement and at the forward limit of its movement.

In testimony whereof I affix my signature, in presence of two witnesses.

THOMAS DAILEY.

Witnesses:
 JOE DAILEY,
 WALTER GROVE.